Nov. 28, 1961     J. C. SMITH ET AL     3,010,615
AUTOMATIC FILTER POWDER DISPENSER
Filed Feb. 24, 1960
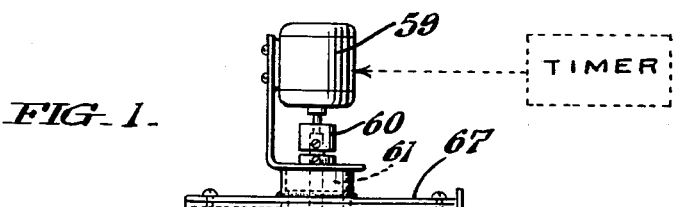
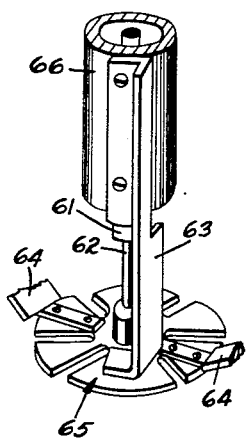
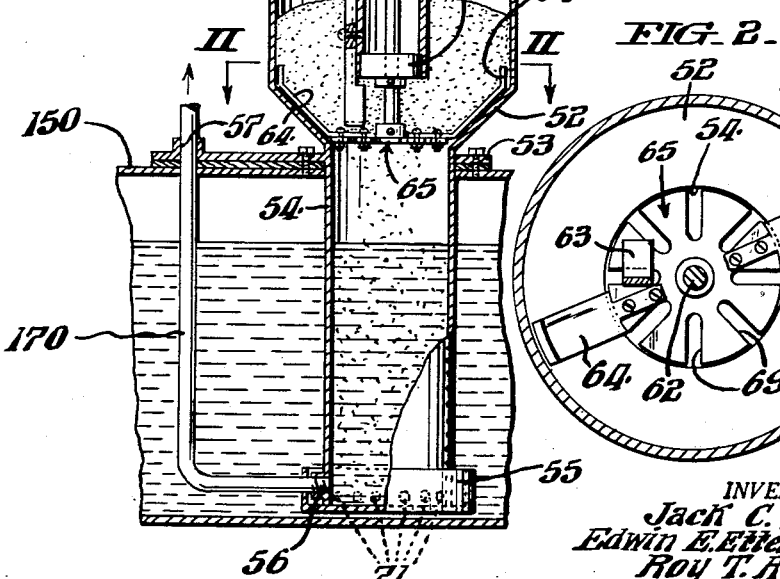
INVENTORS.
Jack C. Smith,
Edwin E. Etterman &
Roy T. Romine,
BY Paul & Paul
ATTORNEYS.

United States Patent Office 3,010,615
Patented Nov. 28, 1961

3,010,615
AUTOMATIC FILTER POWDER DISPENSER
Jack C. Smith, Edwin E. Etterman, and Roy T. Romine, Bowling Green, Ky., assignors to Detrex Chemical Industries, Inc., Detroit, Mich., a corporation of Michigan
Filed Feb. 24, 1960, Ser. No. 10,766
8 Claims. (Cl. 222—227)

This invention relates to a dry cleaning machine for garments or other articles or materials, and in particular to a dispenser for the filter powder which is used with the filter septum for extracting the solid soils from the cleaning solvent. It will be understood that the term "dry cleaning" refers to any cleaning in which the basis for the cleaning solution is a non-aqueous solvent, such as a chlorinated hydrocarbon.

The success of all dry cleaning processes as developed today depends on the use of diatomaceous earth filters for the removal of solid soils from the cleaning solution, whether petroleum or synthetic solvent.

Diatomaceous earth filters consist of a filtering septum of cloth or wire arranged so that the dirty solvent is passed therethrough to remove suspended soils from the solvent. The cloth or wire filter septum, if used alone would soon become clogged with soil. To avoid such clogging, diatomaceous earth, referred to in the trade as filter powder, is added to and coated over the filter septum before the soil-laden solvent is passed through the filter. Such filter powder makes it possible to effect removal and retention of the soil by the filter without clogging.

The addition of filter powder to the filtration system of dry cleaning process machines has heretofore been made in a number of ways. In a first way, the powder is added to the tub enclosure in which the clothes or other articles or materials are to be cleaned, powder being added for each load of cleaning. In a second way, filter powder is added to the solvent storage tank through an opening in the tank with each load of cleaning. In a third way, the powder is placed in the tub or drum in sufficient amount for an entire day's cleaning. In all three ways, the powder is carried with the solvent overflow from the tub to the solvent storage tank and then through the pump and into the filter where it is plated out against the filter septum by solvent flow past the septum.

The first method described above, has the obvious disadvantage of exposing the garments or other articles or materials being cleaned to the filter powder which may cling to certain materials and be very difficult to flush off, thereby requiring long wash cycles. Furthermore, since an addition of filter powder is to be made with each load cleaned, should the operator forget several loads, the filtering surface will become clogged and an increase in filter pressure will be encountered.

The second method described above eliminates the exposure of garments or other articles to the filter powder but still requires that the addition of powder be made faithfully or excessive filter pressures will be encountered.

In filtration systems of the type using either the first or second method described above, the filters are normally of large size as the continuous addition of filter powder requires large filtration surfaces and large volume containers to hold the powder additions. The powder and soil are normally removed from the filter by backwashing only after from several days' to a week's operation.

The third method described eliminates the disadvantages of the other systems but is limited to a filter system in which the filter is cleaned after each day's cleaning.

From the shortcomings of the various means of adding filter powder heretofore employed, it is evident that a more efficient, and preferably an automatically controlled means of adding powder, would be most desirable.

Several approaches to the automatic addition of filter powder were taken before arriving at the development of the means described hereinafter.

Consideration was given to making a slurry of solvent and powder in a separate tank and providing means for agitating the slurry and pumping it at determined rates to the solvent storage tank and hence through the pump into the filter body. Although this method was successful insofar as the end result was concerned, the valving, circuit control, and the inconvenience of mixing a slurry was such that this approach was discarded.

The next step was to attempt to design a hopper with some type of agitation to measure out certain amounts of powder into a container from which a bleeder line from the pressure side of the pump washed the powder into the filter inlet line and hence into the filter.

It was found at this time that diatomaceous earth filter powder has characteristics which make it difficult to feed or convey readily. The particle size is very small, each particle is porous, and each presents innumerable sharp edges. Hence, the particles have great tenacity; they cling one to another and will not slide freely over each other. It was determined by long experimentation that the powder must be contained in a vertically walled housing and agitated to be effectively dispensed. A great many means of agitating were tried and again a margin of success was reached but the valving and control of the solvent-bleed and filter-introduction line proved expensive and erratic.

Finally, the automatic filter powder dispenser described hereinbelow was conceived, built, tested, and found to be extremely satisfactory.

The invention will be best understood from the following detailed description of a preferred embodiment illustrated in the drawing in which:

FIG. 1 is an elevational view, partly in section, showing the structural details of the automatic filter dispenser;

FIG. 2 is a cross-sectional view along the line II—II of FIG. 1; and

FIG. 3 is a detailed perspective view of the stationary arm and rotatable cutting plate which cooperate to effect the dispensing of the powder into the system.

In describing the preferred embodiment of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

Referring now to the drawings, the powder feeder is shown to comprise an upper cylindrical housing 51 affixed to a lower cylindrical housing 54 by a truncated section 52. Plate 53 attached to lower housing 54 provides means for mounting the power filter onto the tank 150 in such manner that lower housing 54 extends into the storage tank 150. Lower section 54 has a coupling 56 for threaded engagement of a suction conduit 170 which passes through opening 57 in plate 53. The conduit 170 then goes onto the suction inlet of a pump, and then to a small area filter by way of a flow control center, as shown, described and claimed in copending patent application entitled "Automatic Dry Cleaning Machine," filed on the same date as the present application.

A ring 55 surrounds the bottom of lower housing 54 having holes 71 spaced annularly on the outer diameter of housing 54.

At the top of the upper cylindrical housing 51 a housing 58 is attached having a side opening fitted with a door 68. Extending vertically through housings 51 and 58 is a cylindrical tube 66, centrally located. Mounted above tube 66, by means of a plate 67 secured to housing 58, is a drive motor 59 connected to a drive motor shaft 62 by a coupling 60. The drive shaft 62 is held in alignment by means of sealed bearings 61 pressed into the top and bottom of tube 66.

As shown in detail in FIG. 3, a stationary wiper 63 is attached to tube 66 near the bottom with its lower extremity just above a cutting plate 65. Cutting plate 65 is attached to the bottom of the drive shaft 62. Wiper paddles 64 (shown partly broken in FIG. 3) are attached to cutting plate 65. Cutting plate 65 has equally spaced slots 69 cut from its outer diameter toward its center, as seen clearly in FIGS. 2 and 3.

In operation, the automatic filter powder feeder 50 contains sufficient filter powder for a normal day's operation. The powder employed is diatomite or diatomaceous earth, and is dispensed by filter powder feeder 50 in quantities large enough to coat the tubular filter septum elements of the filter (of the machine as described in the aforesaid copending patent application) after each cleaning or backwashing operation. In addition, the powder dispenser 50 is arranged to intermittently feed small amounts of the powder to incoming dirty solvent so as to maintain a porous cake on the filter septum elements during the entire filtration cycle.

The operation of the automatic powder dispenser 50 is as follows:

Filter powder diatomaceous earth is loaded into the upper housing 58 through the opened door 68. Door 68 opens outwardly to approximately 45° on hinge points 70 and serves as a chute for the filter powder.

Because of its peculiar properties, diatomaceous earth will not fall through the openings 69 in cutting plate 65 when stationary and hence the powder is retained in upper housing 51. However, when the drive motor 59 is energized, drive shaft 62, cutting plate 65, and wiper arms 64 all rotate and the entire column of powder within the housing 51 tries to rotate along with elements 62, 65 and 64, due again to the properties of diatomaceous earth.

The attempted rotational movement of the powder column as a unit is prevented or arrested, however, by the stationary wiper arm 63. The column of powder is broken up by the stationary arm 63, at least in the region just above the cutter plate 65, and the weight of the column of powder thereabove forces the powder into the slots 69 of the cutting plate 65 where it is sheared off by the rotating cutter and in this manner is forced through the slots 69 and hence spills into the lower housing 54. From there it is conducted through the pump-suction conduit 170 to the pump and then to the small area filter by way of the flow control center, as described in the aforementioned copending patent application. When the cutting plate 65 is rotated, if the stationary wiper arm 63 were to be omitted, the entire column of earth would tend to rotate as a unit within the upper housing 51 and little or no powder would drop through the slots of the cutting plate.

The vertical cylindrical shape of the upper housing 51 of the powder dispenser 50 so contains the filter powder that the weight of the powder always acts in a vertical plane to replace the powder forced through the slots 69 in cutting plate 65 into the lower housing 54.

Ring 55 is provided at the bottom of housing 54 to prevent the powder introduced into housing 54 from becoming dispensed into tank 150 by the turbulence created in the area of openings 71 at the bottom of housing 54.

The powder-dispensing action of the unit 50 is maintained as long as the drive motor 59 is energized. The rotational speed of motor 59 and the size and number of the openings 71 in cutting plate 65 determine the quantity of powder introduced into lower housing 54 in a determined period of time.

The advantages of the powder dispenser 50 are many. A most important advantage is that the necessary addition of filter powder from time to time during the day's operation is no longer among those things requiring operator attention and control, since in practice the drive motor 59 is cycled electrically, as required, by the operation of the machine.

It will be understood that the powder dispenser 50 is employed to establish the precoat on the filter septum elements and also to add powder to each load. In actual practice, the relatively large precoat charge can best be added to lower housing 54 with the pump deenergized. After this addition of powder is made to lower housing 54, the pump is energized to cause this large quantity of powder to be conducted to the filter septum elements, there to form rapidly the powder cake. The powder-feeder drive motor 59 may then be energized intermittently to add to the filter with each wash load.

While not limited thereto, the automatic filter powder dispenser described and claimed in the present application is particularly suited for use as a component in a new dry cleaning machine shown, described and claimed in our copending patent application filed concurrently herewith, entitled "Automatic Dry Cleaning Machine."

As is used in the claims, the term "dry cleaning system" refers to any system employing as the basis for the cleaning solution a non-aqueous synthetic solvent, such as chlorinated hydrocarbon, as distinguished from a cleaning system employing an aqueous solution.

Having thus described our invention, we claim:

1. Apparatus for dispensing automatically diatomaceous earth filter powder into a dry cleaning system employing a non-aqueous solvent, said apparatus comprising; an elongated vertically-positioned walled structure including an upper housing having an access near the top for receiving a supply of diatomaceous earth filter powder; a drive motor having a shaft extending vertically downward through said upper housing along the vertical axis thereof; a rotatable cutting plate attached to the lower end of said drive shaft and substantially at right angle thereto and adapted to be driven rotationally when said drive motor is energized, said cutting plate forming the floor of said upper housing for supporting the diatomaceous earth filter powder, said cutting plate having radial slots therein and having secured thereto upwardly-extending wiper arms adapted to sweep by the inner wall of said upper housing at the lower end thereof; a stationary wiper arm extending upwards from just above said cutting plate into the lower portion of said upper housing for preventing the diatomaceous earth filter powder from rotating as a unit column when said cutting plate is rotated, thereby to break up at least the lower portion of said column of earth; and a lower housing for receiving the diatomaceous earth which is forced through said slots of said cutting plate by the weight of the earth thereabove when said cutting plate is driven rotationally by said drive motor and the rotation of said column of earth is arrested by said stationary arm.

2. Apparatus as claimed in claim 1 characterized in that the lower end portion of said upper housing is tapered inwardly, in that said cutting plate is located at the bottom of said tapered portion, and in that said wiper arms extend upwardly and outwardly for sweeping by the inclined walls of said tapered portion.

3. Apparatus as claimed in claim 2 characterized in the provision of apertures in said lower housing for permitting passage of solvent through said lower housing.

4. Apparatus for dispensing automatically diatomaceous earth filter powder into a dry cleaning system employing a solvent, said apparatus comprising; an elongated vertically-positioned walled structure including an upper cylindrical housing having an access door in its wall near the top thereof for receiving a supply of diatomaceous earth, said upper housing tapering inwardly at its lower end; a centrally located cylindrical tube within said cylindrical upper housing and extending vertically therethrough; a drive motor mounted on top of said upper housing and having a drive shaft extending downwardly through the center of said tube; a rotatable circular cutting plate attached to the lower end of said drive shaft at the lower end of said tapered portion and forming the floor of said upper housing for supporting said diatomaceous earth, said cutting plate having radial open-ended slots therein and having secured thereto upwardly outwardly extending wiper arms for rotational movement adjacent the inner wall of at least said tapered portion of said upper housing, said cutting plate and said wiper arms moving rotationally when said drive motor is energized; a stationary wiper arm secured to the lower end of said tube and having a depending float-like portion located just above said cutting plate, said stationary wiper arm being adapted to prevent said diatomaceous earth from rotating as a column when said cutting plate is rotated, thereby to break up at least the lower portion of said column of earth; and a lower housing secured to said upper housing for receiving the diatomaceous earth which is forced through said slots of said cutting plate by the weight of the earth thereabove when said cutting plate and wiper arms are driven rotationally by said drive motor, said lower housing having holes therein for permitting the passage of solvent through said lower housing.

5. Apparatus as claimed in claim 4 characterized in that said access door is hinged at its lower edge and has side portions which allow the door to serve as a fill chute when the door is open.

6. Apparatus as claimed in claim 5 characterized in the provision of timer means for energizing said drive motor.

7. In apparatus for dispensing automatically diatomaceous earth filter powder and the like into a dry cleaning system employing a solvent; a vertically walled housing for containing a column of said powder, said housing having a floor with slots therein of a size through which said powder will not pass unless agitated; wiper arms secured to said floor and extending part way up the wall of said housing; means for moving said floor and said wiper arms rotationally for causing said column of powder to tend to move rotationally; and fixed arresting means supported above said floor and extending upwardly into the lower portion of said housing inward of the wall thereof for arresting said movement of said column of powder, whereby said column of powder is broken up and forced by the weight of the powder into the slots in said floor where it is sheared off by said rotating floor.

8. In apparatus as claimed in claim 7 characterized by the provision of a lower housing for receiving said powder, said lower housing having holes therein for permitting the passage of solvent therethrough.

References Cited in the file of this patent
UNITED STATES PATENTS

| | | |
|---|---|---|
| 991,758 | Shaw | May 9, 1911 |
| 1,272,726 | Thompson | July 16, 1918 |
| 1,282,081 | Helbing | Oct. 22, 1918 |
| 2,057,768 | De Motte | Oct. 20, 1936 |